US008468585B2

(12) United States Patent
Choi et al.

(10) Patent No.: US 8,468,585 B2
(45) Date of Patent: Jun. 18, 2013

(54) MANAGEMENT OF CREDENTIALS USED BY SOFTWARE APPLICATIONS

(75) Inventors: Christopher Y. Choi, Southport (AU); Christopher J. Hockings, Burleigh Waters (AU); Neil I. Readshaw, Parkwood (AU)

(73) Assignee: International Business Machines Corporation, Armonk, NY (US)

( * ) Notice: Subject to any disclaimer, the term of this patent is extended or adjusted under 35 U.S.C. 154(b) by 1171 days.

(21) Appl. No.: 12/348,738

(22) Filed: Jan. 5, 2009

(65) Prior Publication Data

US 2010/0175115 A1 Jul. 8, 2010

(51) Int. Cl.
*H04L 29/06* (2006.01)

(52) U.S. Cl.
USPC .................................................. 726/8; 726/5

(58) Field of Classification Search
USPC ..................................... 726/6, 5, 8
See application file for complete search history.

(56) References Cited

U.S. PATENT DOCUMENTS

| 6,263,446 | B1 | 7/2001 | Kausik et al. |
| 6,510,464 | B1 * | 1/2003 | Grantges et al. ............... 709/225 |
| 2005/0097330 | A1 | 5/2005 | Lundblade |
| 2007/0055887 | A1 | 3/2007 | Cross et al. |
| 2008/0148373 | A1 * | 6/2008 | Adams et al. ..................... 726/6 |

* cited by examiner

*Primary Examiner* — Christopher Brown
(74) *Attorney, Agent, or Firm* — DeLizio Gilliam, PLLC (57) ABSTRACT

An identity management ("IdM") system can change the credentials at certain intervals. If credentials change, there is no way for an application that uses the credentials to know that the credentials have changed because the application dependency relationships are unknown. When service account credentials change, credentials are typically manually updated for each dependent application. Some embodiments of the inventive subject matter allow IdM systems to track application dependencies for service accounts. The IdM systems can detect when service account credentials change and automatically notify dependent applications of the new service account credentials.

14 Claims, 5 Drawing Sheets

MANAGEMENT OF CREDENTIALS USED BY SOFTWARE APPLICATIONS

BACKGROUND

Embodiments of the inventive subject matter generally relate to the field of identity management systems, and more particularly to management of credentials used by software applications.

Some software applications access external systems (e.g., applications, data repositories, etc.) to retrieve and store data, invoke processes, monitor transactions, etc. In many cases, the external systems authenticate the software applications through login credentials (e.g. a username and a password). The login credentials are often associated with service accounts on the external systems. In many instances, there is a many-to-many relationship between service accounts and software applications. For example, one software application may use several different service accounts to login to several external systems. As another example, one service account may be used by several software applications to log into an external system.

SUMMARY

Embodiments include a method directed to detecting that service credentials of a service account have changed. In some embodiments, service account information can be retrieved from a database. Because the service account information can indicate application dependency relationships, a plurality of dependent applications can be determined based on the service account information. An application can be dependent on the service account if the application uses the service credentials to log into a system associated with the service account. A notification, indicating that the service credentials have changed, can be sent to the plurality of dependent applications.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to Identity Management systems, embodiments may be implemented in other types of password management systems. In other instances, well-known instruction instances, protocols, structures and techniques have not been shown in detail in order not to obfuscate the description.

Because of the many-to-many relationships noted above, service accounts are not typically associated with a particular identity and may be neglected in credential lifecycle management. Typically, service account passwords are configured to never expire to avoid unpredictable system failure. Configuring service account credentials to never expire may lead to unintended security problems. For example, service account credentials may be stolen and misused. Because the credentials are not periodically changed, unlimited amounts of data could be stolen over time.

An identity management ("IdM") system can change the credentials at certain intervals. If credentials change, there is no way for an application that uses the credentials to know that the credentials have changed because the application dependency relationships are unknown. When service account credentials change, credentials are typically manually updated for each dependent application. Some embodiments of the inventive subject matter allow IdM systems to track application dependencies for service accounts. The IdM systems can detect when service account credentials change and automatically notify dependent applications of the new service account credentials.

Figure 1:
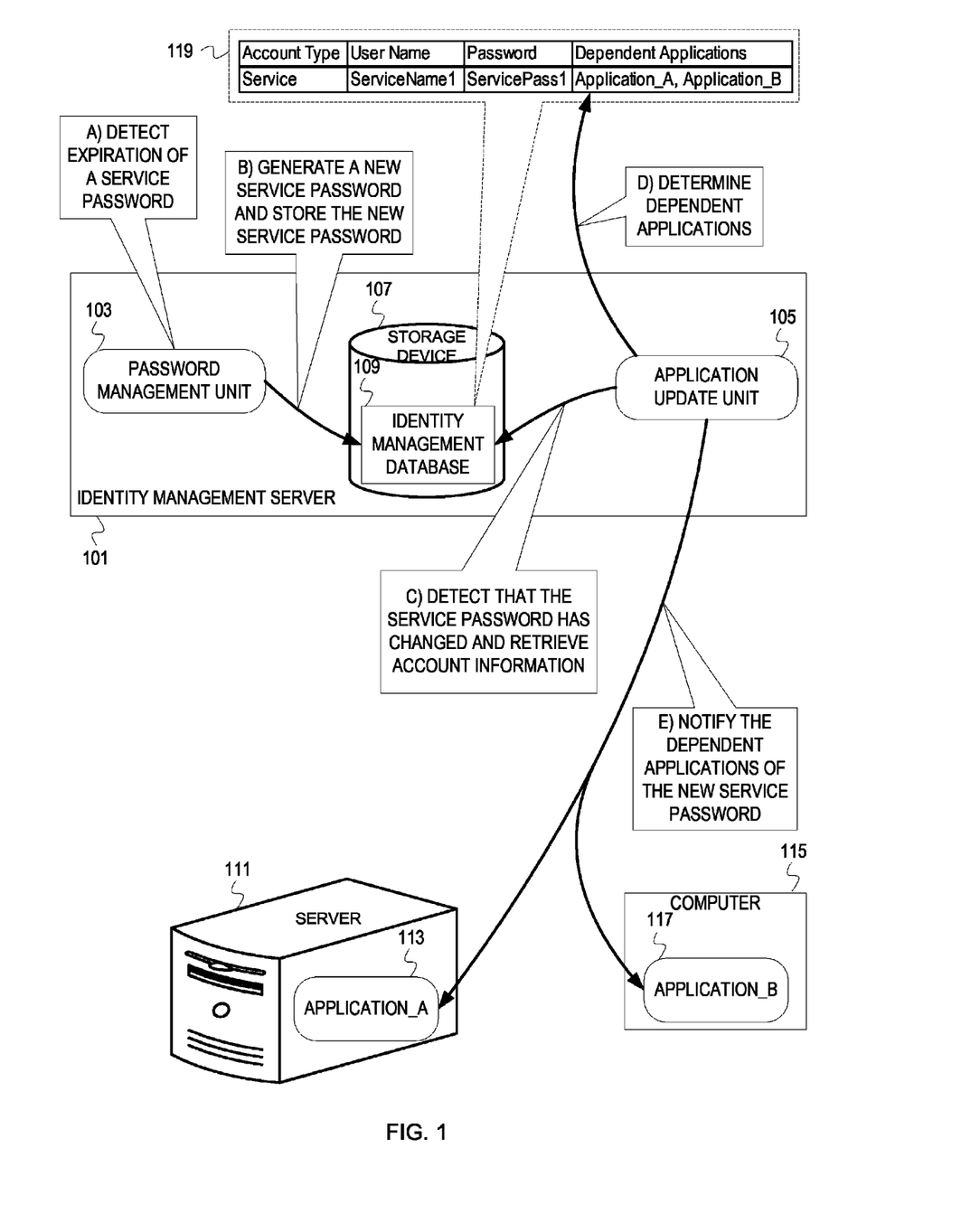
FIG. 1 is an example conceptual diagram of notifying dependent applications that service account credentials have been changed.

FIG. 1 is an example conceptual diagram of notifying dependent applications that service account credentials have been changed. In FIG. 1, an IdM server 101 comprises a password management unit 103, a storage device 107, and an application update unit 105. The storage device 107 comprises an IdM database 109. In this example, the IdM server 101 hosts the storage device 107. However, the storage device 107 may be hosted on a network drive, a second server, etc. An Application_A 113 is running on a server 111. An Application_B 117 is running on a computer 115.

At stage A, the password management unit 103 detects expiration of a password associated with a service account. Examples of detecting expiration of a service password comprise detecting that the current date matches or is past the expiration date, detecting a notification that the password has expired from a system associated with the service account, etc. One or more dependent applications use the service password to log in to applications, data repositories, communications servers, etc.

At stage B, the password management unit 103 generates a new service password and stores the new service password in the identity management database 109. Example techniques for generating a new password include producing a random pattern of numbers and/or letters, incrementing a numeric part of an old password with a random number, etc. The password management unit 103 generates passwords for resources according to password policies established by an administrator or other entity. For example, a password policy for a data repository may state that a password should contain at least 8 characters including one upper-case letter and one numeric character.

At stage C, the application update unit 105 detects that the service password has changed and retrieves account information 119 from the identity management database. Examples of detecting that the service password has changed include receiving a notification from a password management unit, examining a password created date in the IdM database 109, monitoring a memory location in the IdM database, etc. The account information 119 comprises an account type, a user name, a password, and one or more dependent applications. The account information 119 may also comprise information about the one or more dependent applications such as an application identifier, an application owner, a notification address, etc. An application sends a registration request indicating a system and/or a service account to the application update unit 105. In response, the application update unit 105 associates the application dependency with the indicated service account and stores information about the dependent application.

At stage D, the application update unit 105 determines one or more dependent applications from the account information 119. In this example, the one or more dependent applications comprise Application_A 113 and Application_B 117.

At stage E, the application update unit 105 notifies Application_A 113 and Application_B 117 of the new service password. In this example, the notification includes the new service password. In other examples, the notification includes an indication of the service account associated with the new service password. In response, a dependent application can request the new service password from the password management unit 103. After the dependent applications receive the new service password, the dependent applications can re-establish their sessions with the system.

Figure 2:
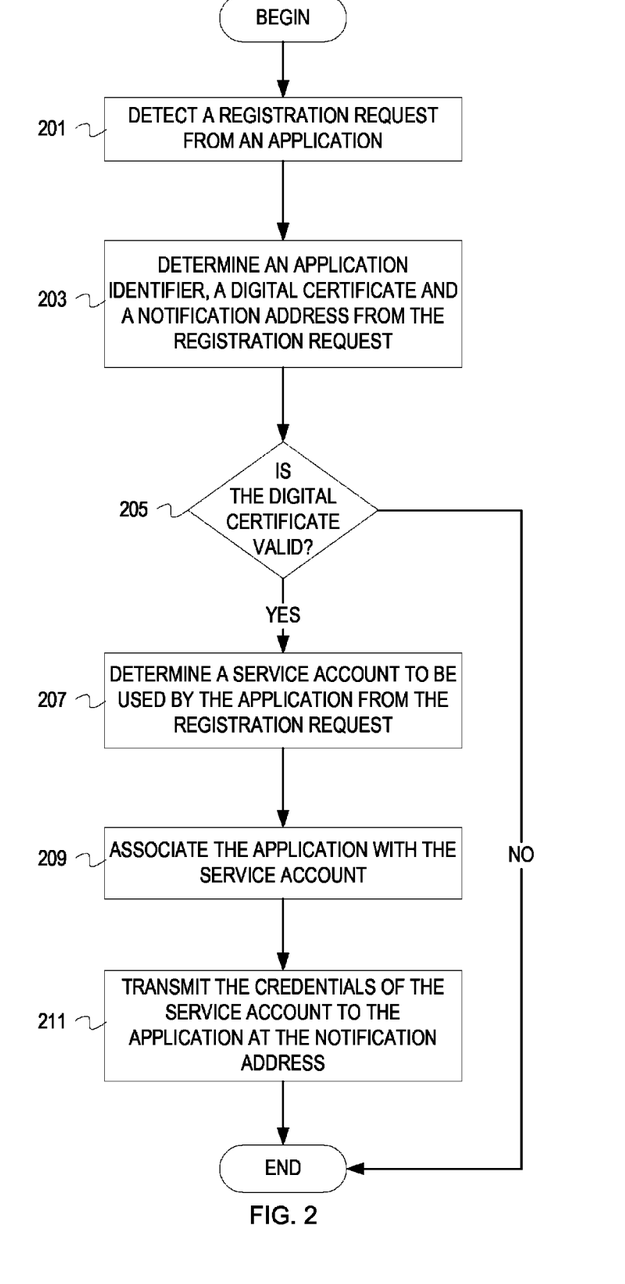
FIG. 2 is a flowchart depicting example operations for associating a dependent application with a service account.

FIG. 2 is a flowchart depicting example operations for associating a dependent application with a service account. Flow begins at block 201, where an application update unit detects a registration request from an application. The registration request can comprise an application identifier, a digital certificate, a notification address, etc. The registration request can also identify a system for which the application is requesting credentials. Flow continues at block 203.

At block 203, the application update unit determines the application identifier, the digital certificate, and the notification address from the registration request. Flow continues at block 205.

At block 205, the application update unit determines if the digital certificate is valid. If the digital certificate is valid, flow continues a block 207. If the digital certificate is not valid, flow ends.

At block 207, the application update unit determines a service account to be used by the application from the registration request. In this example, the application update unit determines the service account associated with the system identifier in the registration request. In other examples, the registration request may include a service account identifier. The application update unit can determine the service account based on the service account identifier in the registration request. Flow continues at block 209.

At block 209, the application update unit associates the application with the service account. Associating the application with the service account establishes an application dependency relationship. The application update unit also stores the application identifier, the digital certificate, the notification address, etc. Flow continues at block 211.

At block 211, the application update unit transmits the credentials of the service account to the application at the notification address and flow ends. The notification can be a domain name service (DNS) address, an Internet protocol (IP) address, etc.

Figure 3:
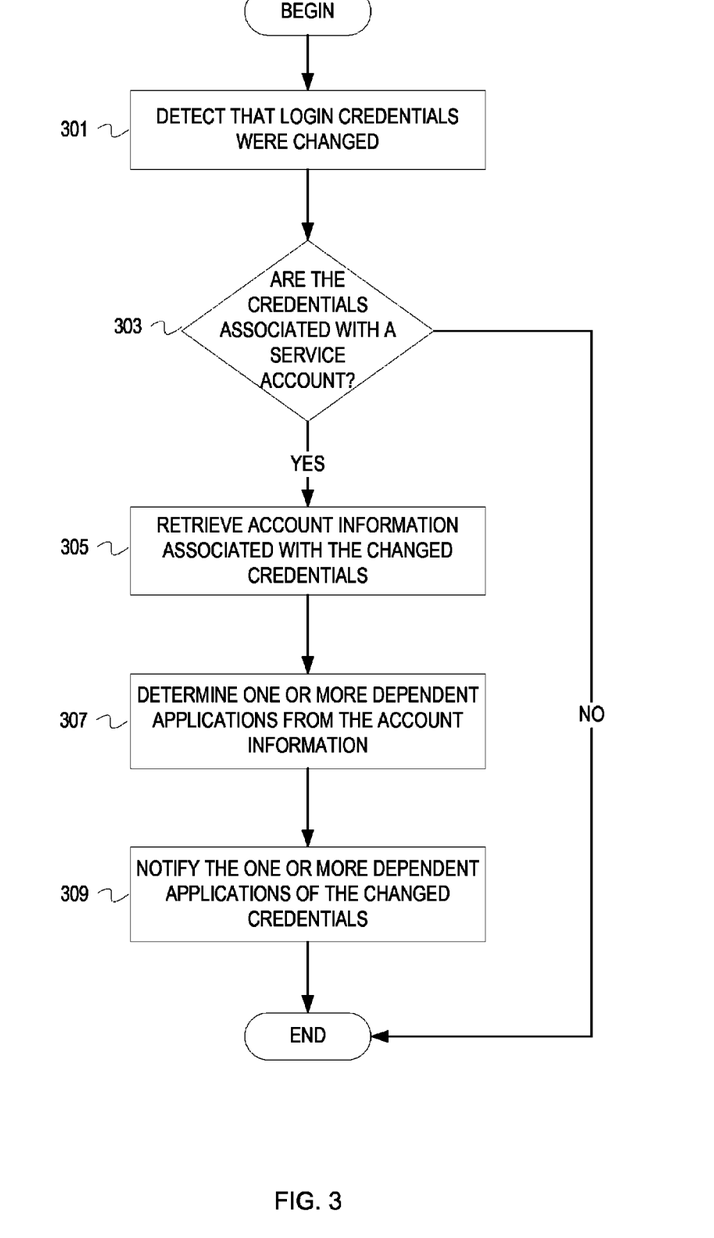
FIG. 3 is a flowchart of example operations for notifying a dependent application that account credentials have changed.

FIG. 3 is a flowchart of example operations for notifying a dependent application that account credentials have changed. Flow begins at block 301, where an application update unit detects that login credentials were changed. Credentials may be changed automatically by a password management unit (e.g., when credentials expire), manually by an administrator, etc. Flow continues at block 303.

At block 303, the application update unit determines if the credentials are associated with a service account. The application update unit examines an account type to determine if the credentials are associated with a service account. If the credentials are associated with a service account, flow continues at block 305. If the credentials are not associated with a service account, flow ends.

At block 305, the application update unit retrieves account information associated with the changed credentials from a database. Flow continues at block 307.

At block 307, the application update unit determines, using the account information, one or more dependent applications. Flow continues at block 309.

At block 309, the application update unit notifies the one or more dependent applications of the change credentials and flow ends. The application update unit sends the notification to a notification address of each dependent application. The account information indicates the notification addresses. In some examples, the changed credentials are included in the notification. In other examples, the notification includes an identifier of the service account for which credentials were changed. In such an embodiment, after a dependent application receives a notification, it can request the changed credentials from the application update unit based on the service account identifier.

Figure 4:
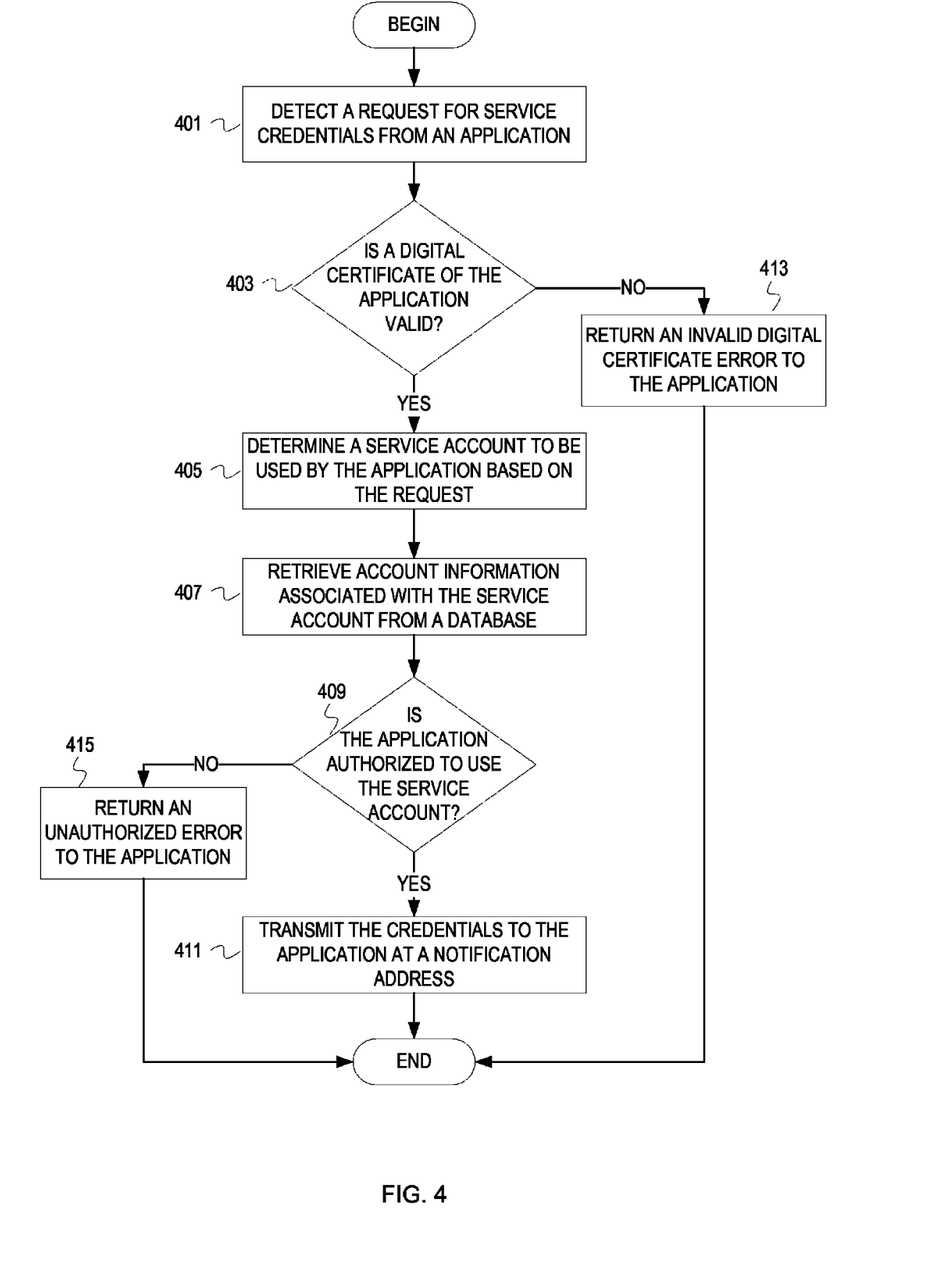
FIG. 4 is a flowchart depicting example operations for transmitting service credentials to an application in response to a request.

A dependent application may request service account credentials after it receives a notification that the credentials have changed. However, a notification may be lost. If a dependent application is unaware that a system's service credentials have changed, a login failure will occur when the dependent application tries to log into the system. When a dependent application is unable to log into a system because of invalid service credentials, the dependent application may request the service credentials. FIG. 4 is a flowchart depicting example operations for transmitting service credentials to an application in response to a request. Flow begins at block 401, where an application update unit detects a request for service credentials from an application. Flow continues at block 403.

At block 403, the application update unit determines if a digital certificate of the application is valid. The application includes its digital certificate information in the request. Although this example uses a digital certificate for authentication, other embodiments can use other authentication techniques. If the digital certificate is valid, flow continues at block 405. If the digital certificate is not valid, flow continues at block 413.

At block 405, the application update unit determines a service account to be used by the application based on the request. For example, the request contains an identifier of the service account. Flow continues at block 407.

At block 407, the application update unit retrieves account information associated with the service account from a database. For example, the application update unit retrieves the account information based on an identifier of the service account. Flow continues at block 409.

At block 409, the application update determines if the application is authorized to use the service account based on the account information. Determining if the application is authorized to use the service account can comprise determining if the account information indicates that the application is a dependent application. If the application is authorized to use the service account, flow continues at block 411. If the application is not authorized to use the service account, flow continues at block 415.

At block 411, the application update unit transmits the credentials to the application at a notification address and flow ends. The credentials are indicated in the account information. The notification address may be indicated in the account information or the request.

At block 413, the digital certificate is not valid, so the application update unit returns an invalid digital certificate error to the application and flow ends.

At block 415, the application is not authorized to use the service account, so the application update unit returns an unauthorized error to the application and flow ends.

In addition to notifying dependent applications of credential changes, storing application dependencies allows an administrator or software to evaluate the impact of changing service account credentials. The administrator can use the application dependencies of a service account to minimize the impact of a credential change. For example, the administrator can determine the number of users of the dependent applications and schedule a password change when usage is low. As another example, the administrator can determine the processes running on the dependent applications. If a process is scheduled to run for an extended time period, the administrator can postpone a password change until the process has completed.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 5:
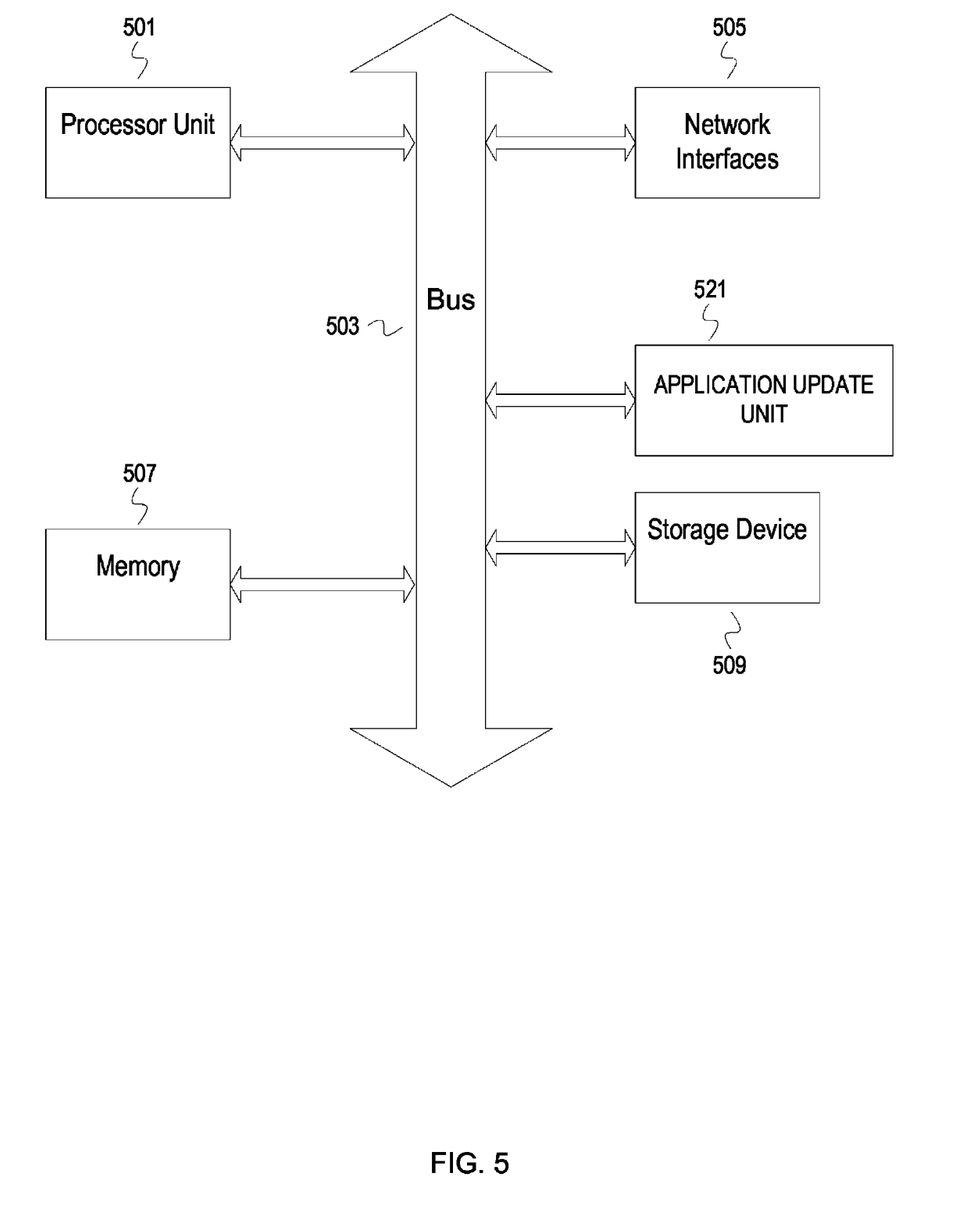
FIG. 5 depicts an example computer system.

FIG. 5 depicts an example computer system. A computer system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, HyperTransport®, InfiniBand®, NuBus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). The computer systems also includes an application update unit that detects that service account credentials have changed, determines one or more dependent applications from service account information, and notifies the one or more dependent applications of the credential change. Any one of these functionalities may be partially (or entirely) implemented in hardware and/or on the processing unit 501. For example, the functionality may be implemented with an application specific integrated circuit, in logic implemented in the processing unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the memory 507 may be coupled to the processor unit 501.

While the embodiments are described with reference to various implementations and exploitations, it will be understood that these embodiments are illustrative and that the scope of the inventive subject matter is not limited to them. In general, techniques for management of credentials used by software applications as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:

determining with a computer processor that a first set of service credentials is used to access a first service account, dependent applications available via the first service account, and other service accounts accessible via the dependent applications;

detecting that the first set of service credentials of the first service account have changed to a changed set of service credentials;

retrieving first account information associated with the first service account from a database, wherein the first account information comprises a dependent application list, and dependent application information;

determining the dependent applications from the dependent application list, wherein the dependent applications log in to the other service accounts using the first set of service credentials; and sending, to the dependent application, the changed set of credentials;

detecting a registration request from a first application;

authenticating the first application;

determining a second service account to be used by the first application based on the registration request;

associating the first application with the second service account;

retrieving a second set of service credentials associated with the second service account from the database; and transmitting the second set of service credentials to the first application.

2. The method of claim 1, wherein the first account information comprises, one or more of, an account type, a username, a password, application owners of the dependent applications, notification addresses of the dependent applications.

3. The method of claim 1, wherein said sending to the dependent applications further comprises determining notification addresses of the dependent applications indicated in the dependent application list.

4. The method of claim 1, wherein said authenticating the first application further comprises determining that a digital certificate of the first application is valid.

5. The method of claim 1, wherein said associating the first application with the first service account further comprises storing an application identifier, a digital certificate and a notification address in the database.

6. The method of claim 1 further comprising:
  detecting, from a second application, a credentials request for a third set of service credentials;
  determining, based on the credentials request, a third service account to be used by the second application;
  retrieving, from the database, a third account information associated with the third service account;
  determining, based on the third account information, that the second application is authorized to use the third service account; and
  transmitting a third set of service credentials to the second application, wherein the third account information contains the third set of service credentials.

7. One or more non-transient computer readable mediums having stored therein a program product, which when executed by a set of one or more processor units causes the set of one or more processor units to perform operations that comprise:
  determining that a first set of service credentials is used to access a first service account, dependent applications available via the first service account, and other service accounts accessible via the dependent applications;
  detecting that the first set of service credentials of the first service account have changed to a changed set of service credentials;
  retrieving first account information associated with the first service account from a database, wherein the first account information comprises a dependent application list, and dependent application information;
  determining the dependent applications from the dependent application list, wherein the dependent applications log in to, using the first set of service credentials, the other service accounts; and
  sending, to the dependent application, the changed set of credentials;
  detecting a registration request from a first application;
  authenticating the first application;
  determining a second service account to be used by the first application based on the registration request;
  associating the first application with the second service account;
  retrieving a second set of service credentials associated with the second service account from the database; and
  transmitting the second set of service credentials to the first application.

8. The non-transient computer readable medium of claim 7, wherein the first account information comprises, one or more of, an account type, a username, a password, application owners of the of dependent applications, notification addresses of the dependent applications.

9. The non-transient computer readable medium of claim 7, wherein said sending to the dependent applications further comprises determining notification addresses of the dependent applications indicated in the dependent application list.

10. The non-transient computer readable medium of claim 7, wherein said authenticating the first application further comprises determining that a digital certificate of the first application is valid.

11. The non-transient computer readable medium of claim 7, wherein said associating the first application with the first service account further comprises storing an application identifier, a digital certificate and a notification address in the database.

12. The non-transient computer readable medium of claim 7, wherein the operations further comprise:
  detecting a credentials request for a third set of service credentials from an second application;
  determining a third service account to be used by the second application based on the credentials request;
  retrieving a third account information associated with the third service account from a database;
  determining that the second application is authorized to use the third service account based on the third account information; and
  transmitting a third set of service credentials to the second application, wherein the third account information contains the third set of service credentials.

13. An apparatus comprising:
A set of one or more processing units;
A network interface; and
An application update unit to,
  determine that a first set of service credentials is used to access a first service account, dependent applications available via the first service account, and other service accounts accessible via the dependent applications;
  detect that the first set of service credentials of the first service account have changed to a changed set of service credentials;
  retrieve first account information associated with the first service account from a database, wherein the first account information comprises a dependent application list, and dependent application information;
  determine the dependent applications from the dependent application list, wherein the dependent applications log in to, using the first set of service credentials, the other service accounts; and send, to the dependent application, the changed set of credentials;

detect a registration request from a first application;

authenticate the first application;

determine a second service account to be used by the first application based on the registration request;

associate the first application with the second service account;

retrieve a second set of service credentials associated with the second service account from the database; and transmit the second set of service credentials to the first application.

14. The apparatus of claim 13, wherein the application update unit comprises one or more non-transient computer readable medium.

* * * * *